US006637540B2

(12) United States Patent
Kielar et al.

(10) Patent No.: US 6,637,540 B2
(45) Date of Patent: *Oct. 28, 2003

(54) STEERABLE DRIVE AXLE WITH ELECTRICALLY-POWERED STEERING APPARATUS

(75) Inventors: Stanley John Kielar, Saginaw, MI (US); Kenneth Lee Westercamp, Frankenmuth, MI (US); Chad David Bauer, Hemlock, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/954,469

(22) Filed: Sep. 17, 2001

(65) Prior Publication Data

US 2002/0096382 A1 Jul. 25, 2002

Related U.S. Application Data

(63) Continuation of application No. 09/507,145, filed on Feb. 18, 2000, now abandoned, which is a continuation of application No. 08/867,643, filed on Jun. 2, 1997, now Pat. No. 6,039,143.

(51) Int. Cl.[7] ................................................ B62D 5/04
(52) U.S. Cl. ....................... 180/402; 180/412; 180/444; 180/445
(58) Field of Search ................................ 180/402, 412, 180/413, 444, 443, 445, 234, 236, 254, 253, 256, 258

(56) References Cited

U.S. PATENT DOCUMENTS

| 1,231,885 | A | * | 7/1917 | Heinze |
| 1,281,428 | A | * | 10/1918 | Stout |
| 4,536,003 | A | * | 8/1985 | Maurer et al. |
| 4,592,440 | A | * | 6/1986 | Ujita et al. |
| 4,660,669 | A | * | 4/1987 | Shimizu |
| 4,768,796 | A | * | 9/1988 | Tashiro et al. |
| 4,941,543 | A | * | 7/1990 | Ewen |
| 5,052,508 | A | * | 10/1991 | Soejima |
| 5,092,417 | A | * | 3/1992 | Oslapas |
| 5,094,312 | A | * | 3/1992 | Hakel |
| 5,129,474 | A | * | 7/1992 | Rauter et al. |
| 5,129,476 | A | * | 7/1992 | Kikuchi et al. |
| 5,145,022 | A | * | 9/1992 | Kido |
| 5,261,500 | A | * | 11/1993 | Bausch, deceased |
| 5,303,791 | A | * | 4/1994 | Hayashi et al. |
| 5,921,343 | A | * | 7/1999 | Yamakaji |

* cited by examiner

Primary Examiner—Anne Marie Boehler
(74) Attorney, Agent, or Firm—Michael D. Smith

(57) ABSTRACT

A steerable drive axle for a motor vehicle including a rigid tubular housing, a pair of steering knuckles at opposite ends of the rigid tubular housing, an expanded chamber in the middle of the rigid tubular housing open on one side for access to a differential gear set in the expanded chamber, a differential cover for closing the open side of the expanded chamber, and an electrically-powered steering apparatus on the cover linked to the steering knuckles. The electrically-powered steering apparatus includes a rack bar passage in the differential cover, a rack bar supported in the rack bar passage for linear translation and linked to the steering knuckles, a pinion head rotatably supported on the differential cover having a pinion gear meshing with a rack gear on the rack bar, an electric motor mounted on the differential cover, and a speed reducer on the differential cover between the pinion head and an output shaft of the electric motor. In a preferred embodiment, the speed reducer consists of a pair of planetary gear sets affording double reduction torque multiplication between the electric motor and the pinion head.

25 Claims, 4 Drawing Sheets

STEERABLE DRIVE AXLE WITH ELECTRICALLY-POWERED STEERING APPARATUS

This application is a continuation of U.S. Ser. No. 09/507,145, filed Feb. 18, 2000, now abandoned which is a continuation of U.S. Ser. No. 09/867,643, filed Jun. 2, 1997 now U.S. Pat. No. 6,039,143, both of which are wholly incorporated herein by reference.

TECHNICAL FIELD

This invention relates to a steerable drive axle for a motor vehicle.

BACKGROUND OF THE INVENTION

A drive axle for a motor vehicle commonly includes a rigid tubular housing, a pair of dirigible wheels rotatably supported on the rigid tubular housing at opposite ends thereof, a pair of axle shafts in the rigid tubular housing connected to the dirigible wheels, and a differential in an expanded chamber in the middle of the tubular housing which distributes drive torque from a drive shaft to each of the axle shafts. Such drive axles are referred to as steerable when they further include steering knuckles between the ends of the rigid tubular housing and corresponding ones of the dirigible wheels, a pair of axle shafts with universal joints to transfer the torque while turning, and a steering apparatus which pivots to the steering knuckles in unison about respective ones of a pair of steering axes of the rigid tubular housing. A steering apparatus on a drive axle described in U.S. Pat. No. 4,592,440, for example, includes a steering assist fluid motor on a cover over the expanded chamber in the middle of the rigid tubular housing of the drive axle. The fluid motor includes a cylinder attached to or integral with the cover and a piston in the cylinder linked to the steering knuckles such that linear translation of the piston in the cylinder induced by differential fluid pressure across the piston effects corresponding pivotal movement in unison of the steering knuckles about the steering axes. A steerable drive axle according to this invention is a novel alternative to the steerable drive axle described in the aforesaid U.S. Pat. No. 4,592,440.

SUMMARY OF THE INVENTION

This invention is a new and improved steerable drive axle for a motor vehicle including a rigid tubular housing, a pair of steering knuckles at opposite ends of the rigid tubular housing pivotable about respective ones of a pair of steering axes of the latter, an expanded chamber in the middle of the rigid tubular housing open on one side for access to a differential gear set in the expanded chamber, a differential cover for closing the open side of the expanded chamber, and an electrically-powered steering apparatus integral with the cover linked to the steering knuckles. The electrically-powered steering apparatus includes a rack bar passage in the differential cover, a rack bar supported in the rack bar passage for linear translation in the length direction of the rack bar passage, a pinion head rotatably supported on the differential cover having a pinion gear meshing with a rack gear on the rack bar, an electric motor mounted on the differential cover, and a speed reducer on the differential cover between the pinion head and an output shaft of the electric motor. In a preferred embodiment, the speed reducer consists of a first planetary gear set having an input through a sun gear rotatable as a unit with the output shaft of the electric motor and an output through a planet carrier and a second planetary gear set having an input through a sun gear rotatable as a unit with the planet carrier of the first planetary gear set and an output through a planet carrier rotatable as a unit with the pinion head.

DESCRIPTION OF THE PREFERRED EMBODIMENT

Figure 1:
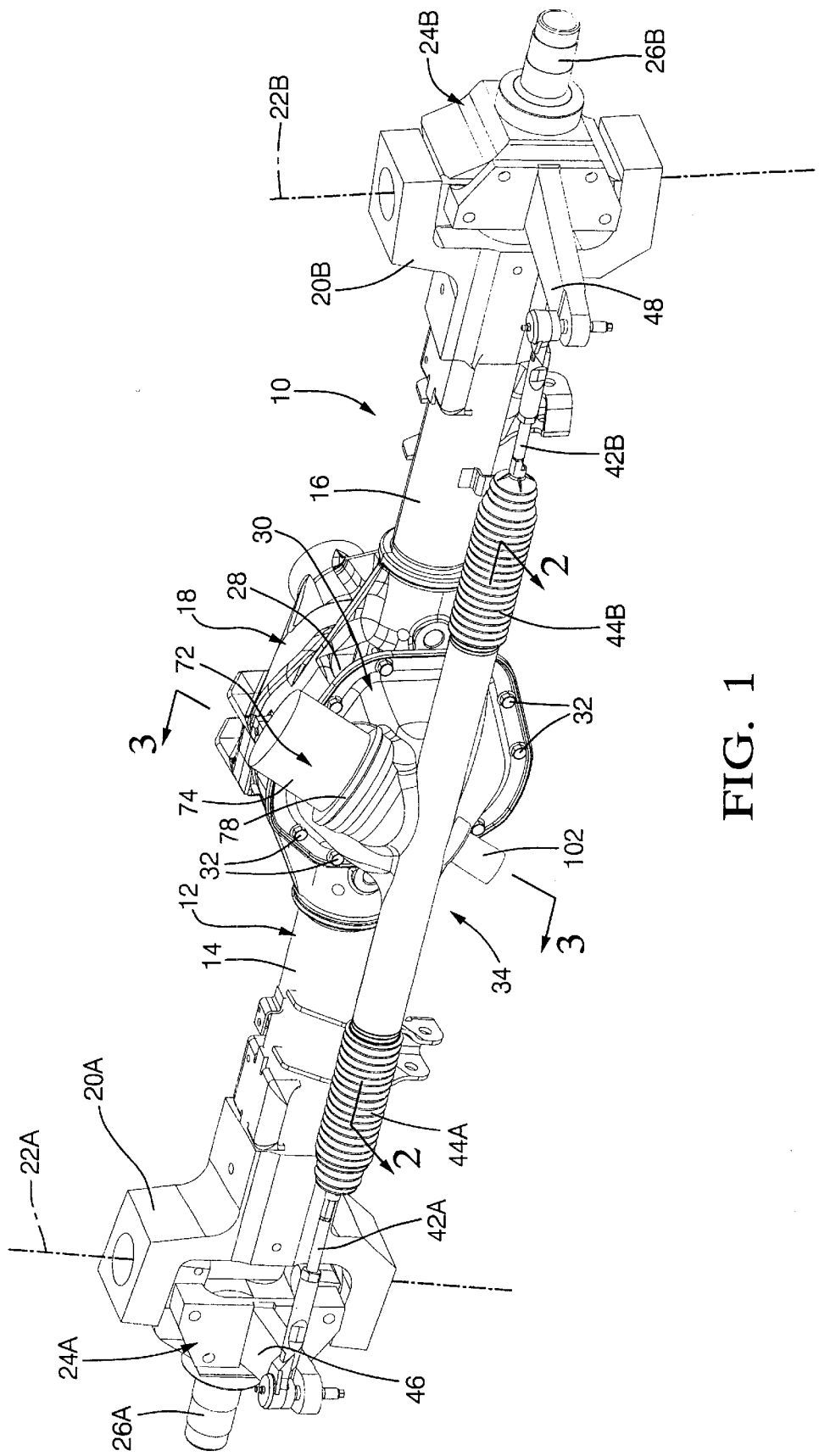
FIG. 1 is a perspective view of a steerable drive axle according to this invention.
Figure 2:
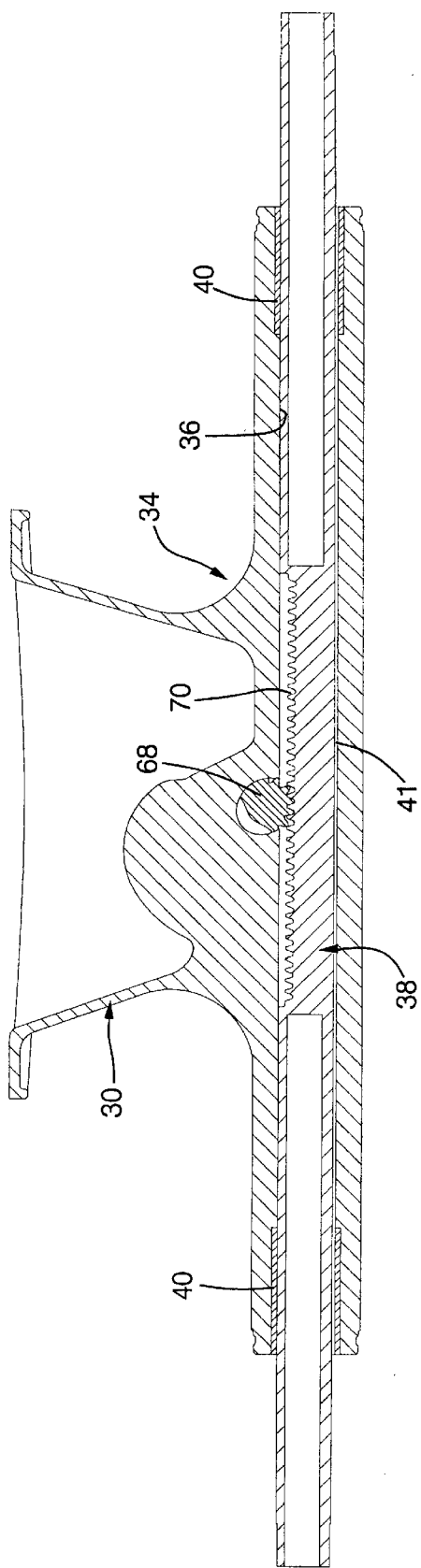
FIG. 2 is an enlarged sectional view taken generally along the plane indicated by lines 2—2 in FIG. 1.

Referring to FIG. 1, a steerable drive axle 10 according to this invention for a motor vehicle, not shown, includes a rigid tubular housing 12 consisting of a pair of tubes 14, 16 and a differential carrier 18 between the tubes. A pair of fork-shaped brackets 20A, 20B are rigidly attached to the tubes 14, 16 at outboard ends thereof and define a pair of steering axes 22A, 22B of the rigid tubular housing. A pair of steering knuckles 24A, 24B are supported on the fork-shaped brackets 20A, 20B, respectively, for pivotal movement about respective ones of the pair of steering axes 22A, 22B. A pair of wheel spindles 26A, 26B are rotatably supported on the steering knuckles 24A, 24B, respectively, and a pair of dirigible wheels, not shown, are connected to respective ones of the wheel spindles for rotation as a unit with the latter.

The interior of the differential carrier 18 constitutes an expanded chamber of the rigid tubular housing 12 in which is disposed a differential gear set for distributing torque from an input shaft, not shown, to a pair of axle shafts, not shown, in the tubes 14, 16 connected to respective ones of the wheel spindles 26A, 26B. An open side 28 of the expanded chamber defined by the interior of the differential carrier affords access to the differential gear set therein and is sealed closed by a differential cover 30 rigidly fastened to the differential carrier 18 by a plurality of bolts 32.

Figure 4:
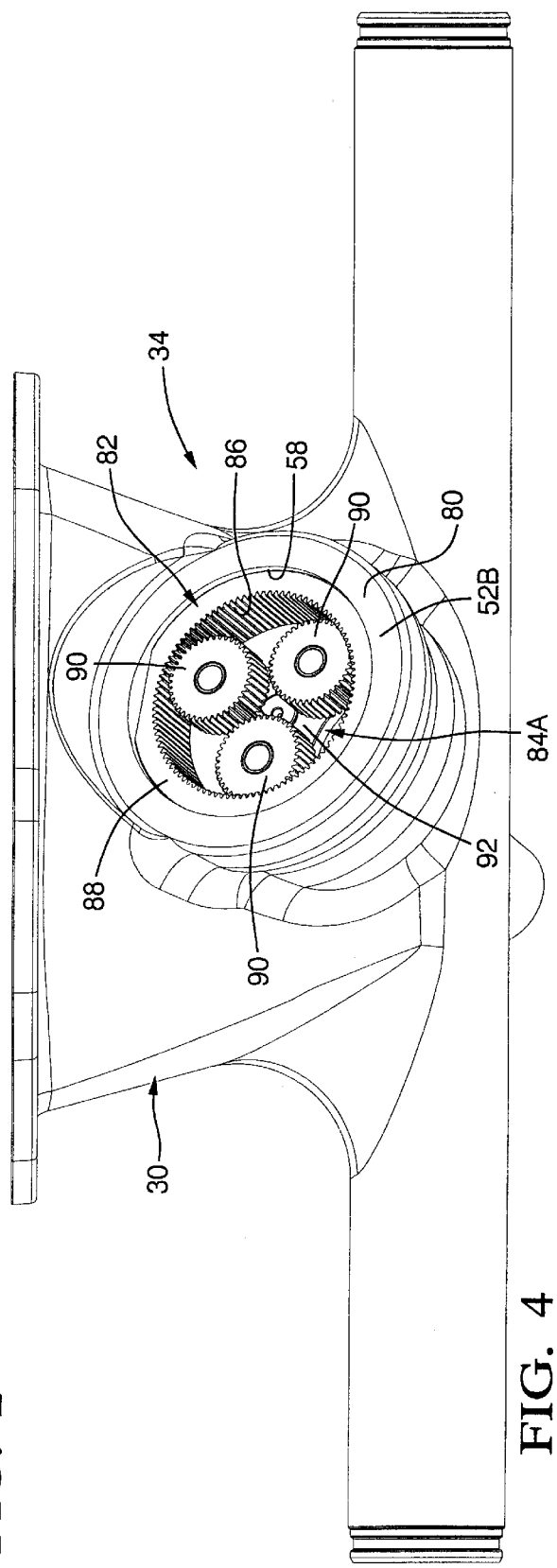
FIG. 4 is a fragmentary perspective view of a differential cover of the steerable drive axle according to this invention.

An electrically-powered steering apparatus 34 on the steerable drive axle 10 includes a rack bar passage 36 in the differential cover 30 and a rack bar 38 supported in the rack bar passage by a pair of sleeve bearings 40 for back and forth linear translation in the length direction of the rack bar passage. The sleeve bearings 40 provide a clearance 41 between the rack bar 38 and the rack bar passage 36, illustrated in exaggerated fashion in FIGS. 3–4, which accommodates resilient flexure of the rack bar in leaf spring fashion between the sleeve bearings. An inboard end, not shown, of each of a pair of tie rods 42A, 42B of the electrically-powered steering apparatus 34 is articulated to a corresponding end of the rack bar 38 and protected against contamination by a corresponding one of a pair of flexible boots 44A, 44B. An outboard end of the tie rod 42A is articulated to a lever arm 46 of the steering knuckle 24A. An outboard end of the tie rod 42B is articulated to a lever arm 48 of the steering knuckle 24B. The tie rods 42A, 42B cooperate with the lever arms 46, 48 in converting back and forth linear translation of the rack bar 38 into pivotal movement in unison of the steering knuckles 24A, 24B about corresponding ones of the steering axes 22A, 22B.

Figure 3:
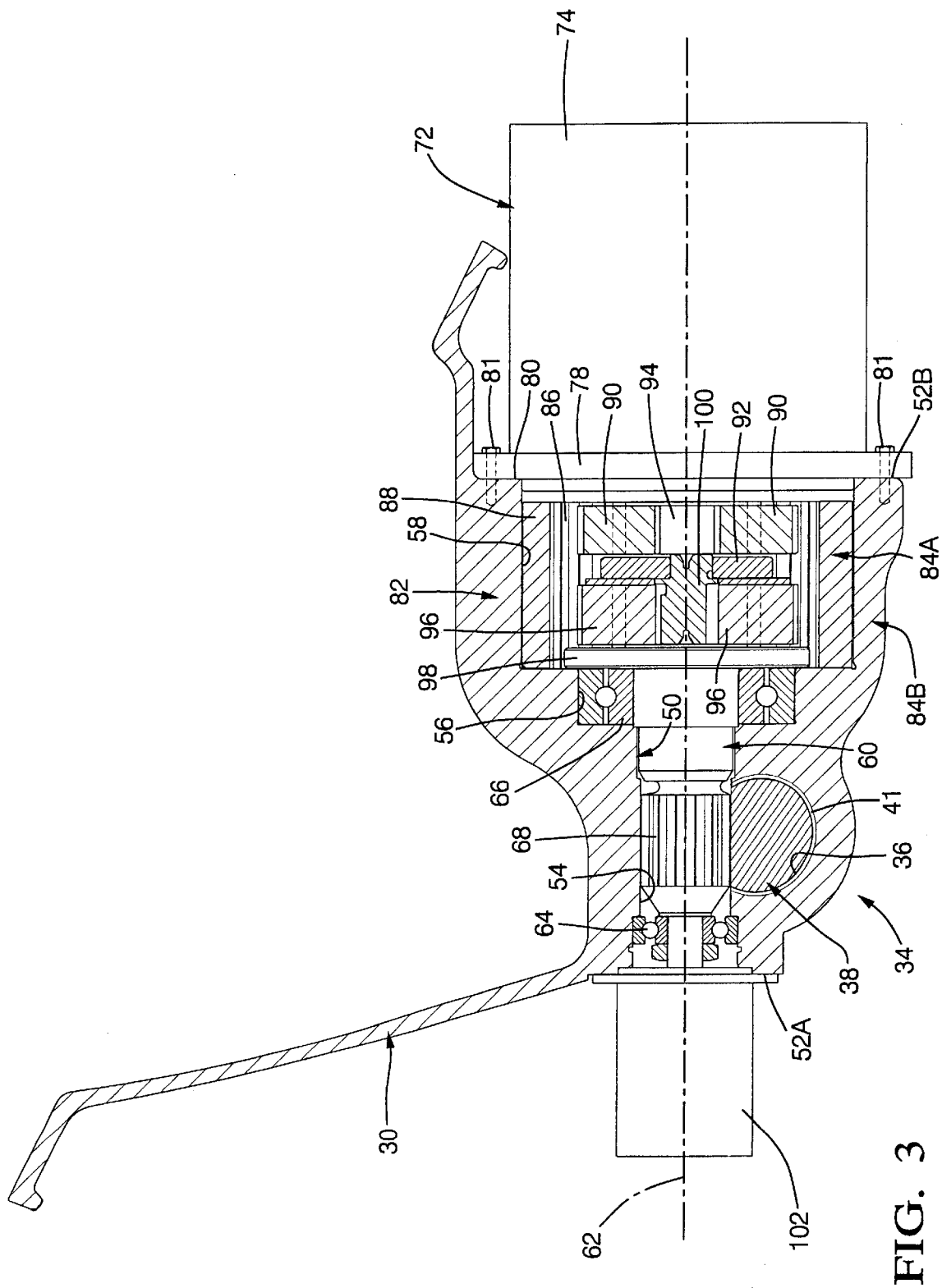
FIG. 3 is an enlarged sectional view taken generally along the plane indicated by lines 3—3 in FIG. 1.

The electrically-powered steering apparatus 34 on the differential cover 30 further includes a stepped bore 50, FIG. 3, in the cover between a pair of outside surfaces 52A, 52B of the latter. The stepped bore 50 has a pinion bore portion 54 intersecting the rack bar passage 36, a bearing seat portion 56, and a speed reducer housing portion 58. A pinion head 60 of the electrically-powered steering apparatus 34 is supported in the pinion bore portion 54 of the stepped bore 50 for rotation about a centerline 62 of the stepped bore by a first bearing 64 at one end of the pinion bore portion and a second bearing 66 in the bearing seat portion 56. A schematically-represented pinion gear 68 on the pinion head 60 cooperates with a rack gear 70 on the rack bar 38 in converting rotation of the pinion head about the centerline 62 of the stepped bore into back and forth linear translation of the rack bar in the rack bar passage 36. Flexure of the rack bar 38 in the aforesaid leaf spring fashion between the sleeve bearings 40 resiliently biases the rack gear 70 against the pinion gear 68 to eliminate lash therebetween.

Figure 5:
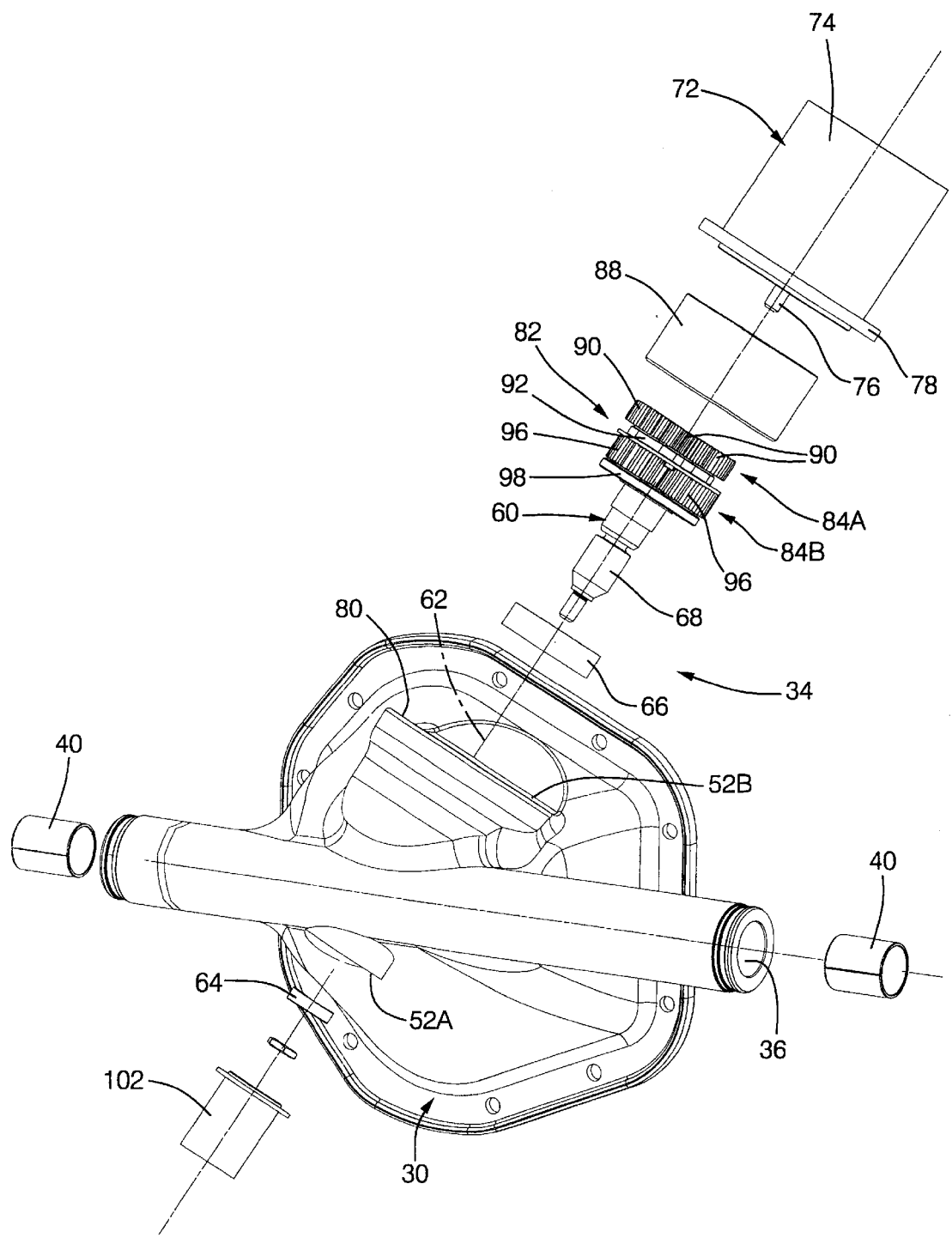
FIG. 5 is a fragmentary, exploded perspective view of the differential housing cover of the steerable drive axle according to this invention and of an electrically-powered steering apparatus on the differential cover.

As seen best in FIGS. 1, 3 and 5, a schematically-represented electric motor 72 of the electrically-powered steering apparatus 34 includes a structural housing 74 and an output shaft 76 rotatable in opposite directions. An annular flange 78 on the structural housing 74 seats against and is rigidly fastened to an annular seat 80 on the outside surface 52B of the differential cover 30 around the speed reducer housing portion 58 of the stepped bore by a plurality of schematically-represented fasteners 81 with the centerline of the motor coincident with the centerline 62 of the stepped bore 50.

A speed reducer 82 of the electrically-powered steering apparatus 34 includes a pair of planetary gear sets 84A, 84B in the speed reducer housing portion 58 of the stepped bore 50 arranged to afford two-stage torque multiplication between the output shaft 76 of the electric motor and the pinion head 60. The planetary gear sets 84A, 84B have a common ring gear 86 formed on an inner surface of a cylindrical sleeve 88 interference fitted in the speed reducer housing portion of the stepped bore. A plurality of planet gears 90 of the planetary set 84A are rotatably supported on a first stage planet carrier 92 and mesh concurrently with the ring gear 86 and a sun gear 94 of the planetary gear set 84A rotatable as unit with the output shaft 76 of the electric motor 72. A plurality of planet gears 96 of the planetary gear set 84B are rotatably supported on a second stage planet carrier 98 rotatable as a unit with the pinion head 60 and mesh concurrently with the ring gear 86 and with a sun gear 100 of the planetary gear set 84B rotatable as unit with planet carrier 92 of the planetary gear set 84A.

In operation, when a control module, not shown, of the motor vehicle turns the electric motor 72 on, torque is transferred from the output shaft 76 of the electric motor to the pinion head 60 through the speed reducer 82 to rotate the pinion head. The pinion gear 68 on the pinion head cooperates with the rack gear 70 on the rack bar 38 to concurrently induce linear translation of the rack bar in the rack bar passage 36 in a direction corresponding to the direction of rotation of the pinion head. The tie rods 42A, 42B cooperate with the lever arms 46, 48 to concurrently pivot the steering knuckles 24A, 24B about the steering axes 22A, 22B whereby the dirigible wheels at the ends of the rigid tubular housing 12 are steered by the electric motor. A position sensor 102 on the outside surface 52A of the differential cover 30 is connected to the pinion head 60 and provides an electronic signal to the aforesaid control module corresponding to the position of the rack bar 38.

What is claimed is:

1. A steerable rear axle for a motor vehicle comprising:
   a rear axle housing, wherein said rear axle housing farther includes at least one opening wherein said rear axle further comprises a cover for said opening, said cover being attachable to said axle housing wherein said cover includes a rack bar passage;
   an electric motor disposed at said axle housing, said motor being a solo steering actuator operably connected to at least one steerable wheel on said axle housing to steer said at least one steerable wheel said electric motor including an output shaft, said motor applying torque to said output shaft when energized, said output shaft being connected to said at least one steerable wheel by a rack and pinion mechanism.

2. A steerable rear axle for a motor vehicle as claimed in claim 1 wherein said opening provides access to an expanded chamber capable of receiving a separate differential gear set.

3. A steerable rear axle for motor vehicle as claimed in claim 1 further comprising:
   a rack bar linearly moveably supported in said rack bar passage;
   at least one steering knuckle mounted to said housing to pivotally support said at least one wheel, said at least one steering knuckle being attached to said rack bar.

4. A steerable rear axle for a motor vehicle as claimed 3 wherein said rack bar is operably connected to said electric motor.

5. A steerable rear axle for a motor vehicle as claimed in claim 1 comprising:
   a speed reducer mounted to said cover and driven by said electric motor.

6. A steerable rear axle for a motor vehicle as claimed in claim 5 wherein said electric motor further is in operable communication with a controller.

7. A steerable rear axle for a motor vehicle as claimed in claim 5 wherein said speed reducer translates rotational energy from said electric motor to a rack bar mounted in a rack bar passage.

8. A steerable rear axle for motor vehicle as claimed in claim 5 wherein said speed reducer comprises a first planetary gear set.

9. A steerable rear axle for motor vehicle as claimed in claim 8 wherein said speed reducer comprises a second planetary gear set operably connected to said first planetary gear set to compoundingly reduce a speed of rotational movement supplied by said electric motor.

10. A steerable rear axle for a motor vehicle comprising:
    a rear axle housing, wherein said rear axle housing further includes at least one opening wherein said rear axle further comprises a cover for said opening, said cover being attachable to said axle housing;
    an electric motor disposed at said axle housing, said motor being a solo steering actuator operably connected to at least one steerable wheel on said axle housing to steer said at least one steerable wheel said electric motor including an output shaft, said motor applying torque to said output shaft when energized, said output shaft being connected to said at least one steerable wheel by a rack and pinion mechanism;
    a pinion gear operably associated with said electric motor;
    a rack bar passage mounted to said cover;

a rack bar linearly moveably supported in said rack bar passage; and a rack gear disposed at said rack bar.

11. A steerable rear axle for a motor vehicle as claimed in claim 10 further comprising a speed reducer driven by said electric motor.

12. A steerable rear axle for a motor vehicle as claimed in claim 11 wherein said speed reducer translates rotational energy from said electric motor to a rack bar mounted in a rack bar passage.

13. A steerable rear axle for a motor vehicle as claimed in claim 10 at least one bearing on said cover operative to support said rack bar in said rack bar passage for back and forth linear translation in said rack bar passage with clearance between said rack bar passage and said rack bar to accommodate resilient flexure of said rack bar in leaf spring fashion by said at least one bearing whereby said rack gear is resiliently biased against said pinion.

14. A differential cover comprising:

a flange mountable to an expanded chamber of an axle housing, said expanded chamber having an opening, said flange mating continuously around its circumference with a lip farmed on said expanded chamber around an opening;

an adaptation to support an electric motor in mechanical communication with a rack bar; and a rack bar housing for housing said rack bar, said adaptation comprising a stepped bore formed in said differential cover in substantial axial alignment with said electric motor, said stepped bore having a first portion in communication with said rack bar housing so that a pinion gear may be disposed in said first portion for engagement with said rack bar, said stepped bore having a second portion intermediate said motor and said first portion, said second portion containing a speed reducer.

15. A rear steering actuator for a vehicle having rear steering comprising:

a housing;

means for attaching said housing to a rear axle of a vehicle;

a passage for a rack bar through said housing;

an electric motor mounted to said housing, said electric motor having an output shaft in mechanical communication with a pinion gear, said pinion gear being positioned for engagement with said rack bar;

a bore formed in said housing in substantial axial alignment with said pinion gear, said bore having a first portion intersecting said passage, said pinion gear being disposed in said first portion, said bore having a second portion intermediate said motor and said first portion, said second portion containing a speed reducer;

a pair of tie rods connected to said rack bar for putting said rack bar in mechanical communication with each rear wheel on a rear axle of said vehicle;

said electric motor providing a sole non-environmental steering force applied to said rack bar.

16. The steering actuator of claim 15, said steering actuator being apart of a steering system for a vehicle, the steering system further comprising:

a controller;

said motor being operably connected to said controller, said motor being a sole source of all non-environmental steering Forces in said steering system.

17. The steering actuator of claim 16 wherein said motor is in operable communication with at least one steerable wheel of said vehicle.

18. The steering actuator of claim 15 wherein said speed reducer is a planetary gear set.

19. The steering actuator of claim 18 wherein said speed reducer further includes a second planetary gear set operably connected to said planetary gear set.

20. The steering actuator of claim 15 wherein said rear axle includes an axle housing and said means for attaching comprises means for attaching said housing to said axle housing.

21. The steering actuator of claim 20 wherein said means for attaching includes threaded fasteners.

22. The steering actuator of claim 20 wherein said axle housing includes an expanded chamber for housing a rear differential, said means for attaching including means for covering an opening in said expanded chamber.

23. The steering actuator of claim 22 wherein said means for attaching includes a flange that mates continuously with a lip formed on said expanded chamber around said opening.

24. The steering actuator of claim 15 wherein said bore comprises a stepped bore wherein said first portion has a narrower diameter than said second portion.

25. The steering actuator of claim 15 wherein said electric motor is disposed substantially in axial alignment with said pinion gear.

* * * * *